United States Patent
Ito et al.

(10) Patent No.: US 9,180,717 B2
(45) Date of Patent: Nov. 10, 2015

(54) VINYL CHLORIDE RESIN LATEX FOR THERMAL SUBLIMATION TRANSFER IMAGE-RECEIVING SHEET, AND THERMAL SUBLIMATION TRANSFER IMAGE-RECEIVING SHEET USING SAME

(75) Inventors: Nobuyuki Ito, Shunan (JP); Tamotsu Sato, Shunan (JP); Kazunori Watanabe, Shunan (JP)

(73) Assignee: TOSOH CORPORATION, Shunan (JP)

( * ) Notice: Subject to any disclaimer, the term of this patent is extended or adjusted under 35 U.S.C. 154(b) by 0 days.

(21) Appl. No.: 13/880,489

(22) PCT Filed: Oct. 18, 2011

(86) PCT No.: PCT/JP2011/073880
§ 371 (c)(1),
(2), (4) Date: Apr. 19, 2013

(87) PCT Pub. No.: WO2012/053496
PCT Pub. Date: Apr. 26, 2012

(65) Prior Publication Data
US 2013/0202819 A1 Aug. 8, 2013

(30) Foreign Application Priority Data
Oct. 21, 2010 (JP) ................................. 2010-236779

(51) Int. Cl.
*B41M 5/52* (2006.01)
*C08L 27/06* (2006.01)
*C08K 5/42* (2006.01)
*C08F 14/06* (2006.01)
*C08F 2/26* (2006.01)
*C08F 114/06* (2006.01)

(52) U.S. Cl.
CPC ............... *B41M 5/5254* (2013.01); *B41M 5/52* (2013.01); *C08F 14/06* (2013.01); *C08F 114/06* (2013.01); *C08K 5/42* (2013.01); *C08L 27/06* (2013.01); *B41M 5/5227* (2013.01); *B41M 2205/02* (2013.01); *B41M 2205/32* (2013.01)

(58) Field of Classification Search
CPC ............ C08K 5/42; C08L 27/06; B41M 5/52; B41M 5/5254; B41M 5/5227; B41M 2205/32; B41M 2205/02; C08F 14/06; C08F 114/06; C08F 2/26
USPC .......................................................... 524/157
See application file for complete search history.

(56) References Cited

U.S. PATENT DOCUMENTS

| 3,725,367 A | 4/1973 | Kemp |
| 4,748,013 A | 5/1988 | Saito et al. |
| 6,433,060 B1 | 8/2002 | Bonardi et al. |
| 2009/0202753 A1* | 8/2009 | Teramae et al. ............... 428/32.2 |
| 2009/0311531 A1 | 12/2009 | Youk et al. |
| 2010/0243141 A1* | 9/2010 | Muro et al. ................... 156/234 |

FOREIGN PATENT DOCUMENTS

| CN | 1144345 A | 3/1997 |
| CN | 101274558 A | 10/2008 |
| EP | 0410467 A2 | 7/1991 |
| EP | 2 511 310 | 10/2012 |
| JP | 2006-264087 | 10/2006 |
| JP | 2008-6752 | 1/2008 |

OTHER PUBLICATIONS

International Search Report for PCT/JP2011/073880 mailed Dec. 20, 2011.
CN Office Action and English translation in CN 201180062000.9p dated Apr. 18, 2014.
Extended European Search Report issued in corresponding European Application No. 11834335 dated Mar. 27, 2015.

* cited by examiner

*Primary Examiner* — Angela C Scott
(74) *Attorney, Agent, or Firm* — Nixon & Vanderhye P.C.

(57) ABSTRACT

The present invention relates to a vinyl chloride resin latex for a thermal sublimation transfer image-receiving sheet, comprising a vinyl chloride homopolymer and an alkylbenzenesulfonate salt in an amount of more than 1 part by weight to 5 parts by weight per 100 parts by weight of the vinyl chloride homopolymer; and a thermal sublimation transfer image-receiving sheet using the same.

3 Claims, No Drawings

VINYL CHLORIDE RESIN LATEX FOR THERMAL SUBLIMATION TRANSFER IMAGE-RECEIVING SHEET, AND THERMAL SUBLIMATION TRANSFER IMAGE-RECEIVING SHEET USING SAME

This application is the U.S. national phase of International Application No. PCT/JP2011/073880 filed 18 Oct. 2011 which designated the U.S. and claims priority to JP 2010-236779 filed 21 Oct. 2010, the entire contents of each of which are hereby incorporated by reference.

TECHNICAL FIELD

The present invention relates to a vinyl chloride resin latex for a thermal sublimation transfer image-receiving sheet, and a thermal sublimation transfer image-receiving sheet using the same. More specifically, the present invention relates to a vinyl chloride resin latex for a thermal sublimation transfer image-receiving sheet capable of forming an excellent image, and a thermal sublimation transfer image-receiving sheet capable of forming an excellent image.

BACKGROUND ART

Conventionally, it has been done to form a character or an image on a transfer-receiving material by using a thermal transfer system. As the thermal transfer system, a thermal sublimation transfer system and a thermal melting transfer system are being widely used. Of these, the thermal sublimation transfer system is a system using a sublimable dye as a color material, where the dye in the sublimable dye layer on a thermal transfer sheet is transferred onto a transfer-receiving material such as thermal transfer image-receiving sheet by using a heating device such as thermal head or laser beam, which is controlled to generate heat according to image information, and an image is thereby formed. In this thermal sublimation transfer system, the amount of the dye transferred can be controlled on a dot basis by overheating in an extremely short time. Thanks to use of a dye as the color material, the thus-formed image is very clear and has excellent transparency and therefore, the image obtained is excellent in the half-tone reproducibility and gradation and becomes an extremely high-definition image. Thus, a high-quality image comparable to a full-color silver-salt photograph can be obtained. Moreover, as compared with the normal silver-salt photographic image forming system, the thermal sublimation transfer system has many advantages such as being a dry process, capable of visualizing an image directly from digital data, and easy to duplicate.

Generally, in a thermal transfer image-receiving sheet, at least a dye image-receiving layer (receptive layer) and a heat-insulating layer are formed on a support. As the resin for forming the receptive layer, a vinyl chloride-based resin is used, because this is excellent in dyeability with a dye and releasability and causes no abnormal transfer such as fusion bonding between the thermal transfer sheet and the thermal transfer image-receiving sheet during thermal transfer. At the time of coating a vinyl chloride-based resin on a base material sheet to form a receptive layer, the resin has been conventionally used by dissolving it in an organic solvent.

However, it is concerned that the working environment is worsened by the use of an organic solvent.

To eliminate this concern, a method of forming a receptive layer by using a vinyl chloride-based resin latex without use of an organic solvent is being widely studied (Patent Document 1).

Nevertheless, a satisfactory image is not obtained by a thermal sublimation transfer image-receiving sheet using the vinyl chloride-based resin latex.

In this way, a vinyl chloride-based resin latex giving a thermal sublimation transfer image-receiving sheet capable of excellent image formation is not known.

BACKGROUND ART DOCUMENT

Patent Document

Patent Document 1: JP-A-2006-264087

SUMMARY OF INVENTION

Problem that Invention is to Solve

An object of the present invention is to provide a vinyl chloride resin latex for a thermal sublimation transfer image-receiving sheet, which is excellent in the storage stability of the latex and allows for excellent image formation, and a thermal sublimation transfer image-receiving sheet using the same.

Means for Solving Problem

As a result of intensive studies to attain the above-described object, the present inventors have found that a vinyl chloride resin latex containing an alkylbenzenesulfonate salt in an amount of more than 1 part by weight to 5 parts by weight per 100 parts by weight of a vinyl chloride homopolymer is excellent in the storage stability of the latex and a thermal sublimation transfer image-receiving sheet produced using the latex allows for excellent image formation. The present invention has been accomplished based on this finding. That is, the present invention provides a vinyl chloride resin latex for a thermal sublimation transfer image-receiving sheet, characterized by containing an alkylbenzenesulfonate salt in an amount of more than 1 part by weight to 5 parts by weight per 100 parts by weight of a vinyl chloride homopolymer, and a thermal sublimation transfer image-receiving sheet using the same.

More specifically, the gist of the present invention resides in the following (1) to (6).

(1) A vinyl chloride resin latex for a thermal sublimation transfer image-receiving sheet, comprising:

an alkylbenzenesulfonate salt in an amount of more than 1 part by weight to 5 parts by weight per 100 parts by weight of a vinyl chloride homopolymer.

(2) The vinyl chloride resin latex for a thermal sublimation transfer image-receiving sheet as described in (1) above, wherein, preferably, the alkylbenzenesulfonate salt is sodium dodecylbenzenesulfonate.

(3) The vinyl chloride resin latex for a thermal sublimation transfer image-receiving sheet as described in (1) or (2) above, wherein a higher fatty acid salt is further contained in an amount of 3.0 parts by weight or less per 100 parts by weight of the vinyl chloride homopolymer.

(4) The vinyl chloride resin latex for a thermal sublimation transfer image-receiving sheet as described in (3) above, wherein, preferably, the higher fatty acid salt is a salt of a higher fatty acid with any one of potassium, sodium, ammonia and triethanolamine.

(5) The vinyl chloride resin latex for a thermal sublimation transfer image-receiving sheet as described in any one of (1) to (4) above, wherein, preferably, an average particle diameter of the vinyl chloride homopolymer is 0.3 μm or less.

(6) A thermal sublimation transfer image-receiving sheet, wherein a receptive layer is formed using the vinyl chloride resin latex as described in any one of (1) to (5) above.

Effects of Invention

The vinyl chloride resin latex of the present invention is excellent in the storage stability and therefore, a thermal sublimation transfer image-receiving sheet allowing for excellent image formation can be provided.

MODE FOR CARRYING OUT INVENTION

The present invention is described in detail below.

The vinyl chloride resin latex for a thermal sublimation transfer image-receiving sheet (hereinafter, sometimes simply referred to as "vinyl chloride resin latex") of the present invention contains an alkylbenzenesulfonate salt in an amount of more than 1 part by weight to 5 parts by weight per 100 parts by weight of a vinyl chloride homopolymer.

The vinyl chloride homopolymer is a polymer obtained by polymerizing a vinyl chloride monomer alone.

Examples of the alkylbenzenesulfonate salt include sodium dodecylbenzenesulfonate, potassium dodecylbenzenesulfonate, ammonium dodecylbenzenesulfonate, and the like. The structure of the alkyl group may be either a linear structure or a branched structure. In view of easy availability, sodium dodecylbenzenesulfonate is preferred. If the amount of the alkylbenzenesulfonate salt is 1 part by weight or less, the latex undergoes aggregation to generate a precipitate during storage of the latex and thus has poor storage stability, whereas if the amount exceeds 5 parts by weight, the image is blurred and a good image cannot be obtained. In order to more enhance the storage stability, the alkylbenzenesulfonate salt is preferably contained in an amount of 1.5 to 5 parts by weight.

The vinyl chloride resin latex of the present invention preferably contains a higher fatty acid salt in an amount of 3.0 parts by weight or less per 100 parts by weight of the vinyl chloride homopolymer.

Examples of the higher fatty acid salt include a salt of lauric acid, myristic acid, palmitic acid, stearic acid, oleic acid or the like with an alkali. In view of easy availability, a salt with sodium, potassium, ammonia or triethanolamine is preferred.

The average particle diameter of the vinyl chloride homopolymer in the vinyl chloride resin latex is preferably 0.3 μm or less so as to suppress generation of a precipitate after long-term storage.

The vinyl chloride resin latex of the present invention may contain, for example, a chain transfer agent, a reducing agent, a buffering agent, an emulsifier other than an alkylbenzenesulfonate salt and a higher fatty acid salt, and the like. Here, the chain transfer agent may be sufficient if it can adjust the polymerization degree of the vinyl chloride-based polymer, and examples thereof include halogen-based hydrocarbons such as trichloroethylene and carbon tetrachloride; mercaptans such as 2-mercaptoethanol, octyl 3-mercaptopropionate and dodecyl mercaptan; acetone, aldehydes such as n-butyraldehyde, and the like. Examples of the reducing agent include sodium sulfite, ammonium sulfite, sodium hydrogensulfite, ammonium hydrogensulfite, ammonium thiosulfate, potassium metabisulfite, sodium dithionite, sodium formaldehyde sulfoxylate, L-ascorbic acid, dextrose, ferrous sulfate, copper sulfate, and the like. Examples of the buffering agent include an alkali metal mono- or dihydrogenphosphate, potassium hydrogenphthalate, sodium hydrogencarbonate, and the like. Examples of the emulsifier other than an alkylbenzenesulfonate salt and a higher fatty acid salt include an anionic surfactant such as alkylsulfuric ester salts (e.g., sodium laurylsulfate ester, myristylsulfuric acid ester, and the like), sulfosuccinate salts (e.g., sodium dioctylsulfosuccinate, sodium dihexylsulfosuccinate), polyoxyethylene alkylsulfuric ester salts, polyoxyethylene alkylarylsulfuric ester salts, and the like; and a nonionic surfactant such as sorbitan esters (e.g., sorbitan monooleate, polyoxyethylene sorbitan monostearate, and the like), polyoxyethylene alkylphenyl ethers, polyoxyethylene alkyl esters, polyalkylene glycols, polyvinyl alcohol, partially saponified polyvinyl alcohol, partially saponified polymethyl methacrylate, polyacrylic acid, and salts or the like thereof, and the like. One of these may be used alone, or two or more kinds thereof may be contained.

The vinyl chloride resin latex of the present invention is obtained by emulsion-polymerizing a vinyl chloride monomer in the presence of 0.05 to 5 parts by weight, preferably from 0.2 to 5 parts by weight, more preferably from 0.5 to 5 parts by weight, of an alkylbenzenesulfonate salt.

The emulsion polymerization is performed by using water as a dispersion medium and polymerizing a vinyl chloride monomer in an amount of 5 to 150 wt % based on the dispersion medium under stirring with use of a polymerization initiator at approximately from 30 to 100° C., preferably from 40 to 80° C., for 3 to 24 hours, in the presence of an alkylbenzenesulfonate salt.

Examples of the polymerization initiator includes a water-soluble initiator such as potassium persulfate and ammonium persulfate, an oil-soluble initiator such as 2,2'-azobisisobutyronitrile, 2,2'-azobis-2-methylbutyronitrile, lauroyl peroxide, tert-butyl peroxypivalate, diacyl peroxide, peroxyester and peroxydicarbonate, and the like.

The polymerization conversion ratio of the vinyl chloride monomer is from 80 to 97 wt % based on all monomers.

The polymerization is terminated by lowering the pressure in the vessel to normal pressure and further to reduced pressure and recovering the monomer. The polymerization may be also terminated by adding a polymerization inhibitor.

If desired, an alkylbenzene sulfonate salt may be additionally added to the latex after the completion of polymerization so as to contain the sulfonate in an amount of more than 1 part by weight to 5 parts by weight per 100 parts by weight of the vinyl chloride homopolymer.

Furthermore, at the time of producing the vinyl chloride resin latex of the present invention, a chain transfer agent, a reducing agent, a buffering agent, an emulsifier other than an alkylbenzenesulfonate salt, and the like may be also added for the purpose of stabilizing the polymerization or reducing the amount of scale produced.

The vinyl chloride resin latex for a thermal sublimation transfer image-receiving sheet of the present invention is coated on a sheet and dried, whereby a receptive layer of a thermal sublimation transfer image-receiving sheet can be formed. Here, the thermal sublimation transfer image-receiving sheet has, for example, a configuration composed of an underlying layer, a heat-insulating layer and a receptive layer on a support or the like.

EXAMPLES

The present invention is described in greater detail below based on Examples, but the present invention is not limited thereto.

Various evaluation methods of the latex, the production method of the thermal sublimation transfer image-receiving sheet, and the image forming test method are as follows.

<Storage Stability of Latex>

The vinyl chloride resin latex was diluted with water to adjust the solid content to 30 wt %, and 500 g of the vinyl chloride resin latex was put in a transparent glass bottle. After standing still at room temperature for 2 weeks, the presence or absence of a precipitate generated in the latex was confirmed with an eye and evaluated as follows.

A: Absolutely no precipitate generation.
B: Slight generation is observed.
C: Considerable precipitate generation is observed.

<Average Particle Diameter of Vinyl Chloride Homopolymer>

A measurement sample prepared by adding water to the vinyl chloride resin latex, thereby adjusting the concentration to give a laser transmittance of 84 to 86%, was measured for the median diameter by using a laser diffraction/scattering particle size analyzer (LA-920, trade name, manufactured by Horiba Seisakusho, Ltd.), and the obtained value was taken as the average particle diameter.

<Production Method of Thermal Sublimation Transfer Image-Receiving Sheet>

The vinyl chloride resin latex was diluted with water to adjust the solid content to 30 wt %. Separately, a PPC sheet (Mitsubishi PPC Paper A4 (acid-free paper), produced by Mitsubishi Paper Mills, Ltd.) was fixed on a flat metal plate. The latex adjusted to a solid content of 30 wt % was cast on the top of the PPC paper and coated by a doctor blade to have a thickness of about 0.25 mm. After the coating, the PPC paper was dried at room temperature for 72 hours to produce a thermal sublimation transfer image-receiving sheet.

<Image Forming Test Method>

After confirming that the thermal sublimation transfer image-receiving sheet produced using PPC paper was dried, the PPC paper was cut into the same size as Paper KL-361P (color ink/paper set, manufactured by Canon Inc.), and the cut PPC paper was adhered on the printing surface of KL-361P by using a double-sided adhesive tape.

Paper was set in a paper cassette of Selphy CP-800 (sublimation thermal transfer printer, manufactured by Canon Inc.) such that the surface coated with the test latex works out to the printing surface, and subjected to printing in Selphy CP-800. The image formability was judged as follows by the clearness of printing and the degree of blur.

5: Printing is clear and absolutely no blur is observed.
4: Blur is slightly observed.
3: Print contents are readable but color is pale.
2: Color is pale and print contents are unreadable.
1: Printing cannot be performed.

Example 1

A 2.5-L autoclave was charged with 900 g of deionized water, 750 g of vinyl chloride monomer, 5 g of 3 wt % potassium persulfate, and 75 g of an aqueous sodium dodecylbenzenesulfonate solution having a concentration of 5 wt % (0.50 parts by weight based on the monomer), and by raising the temperature to 66° C., emulsion polymerization was allowed to proceed. After the saturated vapor pressure of vinyl chloride at 66° C. was reduced to 0.7 MPa, unreacted vinyl chloride monomer was recovered. To the residue, 87 g of an aqueous sodium dodecylbenzenesulfonate solution having a concentration of 5 wt % (0.58 parts by weight based on the monomer) was additionally added to obtain a vinyl chloride resin latex (amount of sodium dodecylbenzenesulfonate per 100 parts by weight of vinyl chloride homopolymer: 1.20 parts by weight). The average particle diameter was measured and found to be 0.1 μm.

The storage stability of the latex was evaluated, as a result, only slight precipitate generation was observed (B) and thus, the result was good. When an image forming test was performed, printing was clear and absolutely no blur was observed, revealing a good result (score: 5).

Example 2

A 2.5-L autoclave was charged with 900 g of deionized water, 750 g of vinyl chloride monomer, 5 g of 3 wt % potassium persulfate, and 75 g of an aqueous sodium dodecylbenzenesulfonate solution having a concentration of 5 wt % (0.50 parts by weight based on the monomer), and by raising the temperature to 66° C., emulsion polymerization was allowed to proceed. After the saturated vapor pressure of vinyl chloride at 66° C. was reduced to 0.7 MPa, unreacted vinyl chloride monomer was recovered. To the residue, 195 g of an aqueous sodium dodecylbenzenesulfonate solution having a concentration of 5 wt % (1.30 parts by weight based on the monomer) was additionally added to obtain a vinyl chloride resin latex (amount of sodium dodecylbenzenesulfonate per 100 parts by weight of vinyl chloride homopolymer: 2.00 parts by weight). The average particle diameter was measured and found to be 0.1 μm.

The storage stability of the latex was evaluated, as a result, absolutely no precipitate generation was observed (A) and thus, the result was good. When an image forming test was performed, printing was clear and absolutely no blur was observed, revealing a good result (score: 5).

Example 3

A 2.5-L autoclave was charged with 900 g of deionized water, 750 g of vinyl chloride monomer, 5 g of 3 wt % potassium persulfate, and 75 g of an aqueous sodium dodecylbenzenesulfonate solution having a concentration of 5 wt % (0.50 parts by weight based on the monomer), and by raising the temperature to 66° C., emulsion polymerization was allowed to proceed. After the saturated vapor pressure of vinyl chloride at 66° C. was reduced to 0.7 MPa, unreacted vinyl chloride monomer was recovered. To the residue, 235 g of an aqueous sodium dodecylbenzenesulfonate solution having a concentration of 5 wt % (1.57 parts by weight based on the monomer) was additionally added to obtain a vinyl chloride resin latex (amount of sodium dodecylbenzenesulfonate per 100 parts by weight of vinyl chloride homopolymer: 2.30 parts by weight). The average particle diameter was measured and found to be 0.1 μm.

The storage stability of the latex was evaluated, as a result, absolutely no precipitate generation was observed (A) and thus, the result was good. When an image forming test was performed, printing was clear and absolutely no blur was observed, revealing a good result (score: 5).

Example 4

A 2.5-L autoclave was charged with 900 g of deionized water, 750 g of vinyl chloride monomer, 5 g of 3 wt % potassium persulfate, and 75 g of an aqueous sodium dodecylbenzenesulfonate solution having a concentration of 5 wt % (0.50 parts by weight based on the monomer), and by raising the temperature to 66° C., emulsion polymerization was allowed to proceed. After the saturated vapor pressure of vinyl chloride at 66° C. was reduced to 0.7 MPa, unreacted vinyl chloride monomer was recovered. To the residue, 465 g of an aqueous sodium dodecylbenzenesulfonate solution having a concentration of 5 wt % (3.10 parts by weight based on the monomer) was additionally added to obtain a vinyl chloride resin latex (amount of sodium dodecylbenzenesulfonate per 100 parts by weight of vinyl chloride homopolymer: 4.00 parts by weight). The average particle diameter was measured and found to be 0.1 μm.

The storage stability of the latex was evaluated, as a result, absolutely no precipitate generation was observed (A) and thus, the result was good. When an image forming test was performed, printing was clear and absolutely no blur was observed, revealing a good result (score: 5).

Example 5

A 2.5-L autoclave was charged with 900 g of deionized water, 750 g of vinyl chloride monomer, 15 g of 3 wt % potassium persulfate, and 75 g of an aqueous sodium dodecylbenzenesulfonate solution having a concentration of 5 wt % (0.50 parts by weight based on the monomer), and by raising the temperature to 54° C., emulsion polymerization was allowed to proceed. After the saturated vapor pressure of vinyl chloride at 54° C. was reduced to 0.5 MPa, unreacted vinyl chloride monomer was recovered. To the residue, 235 g of an aqueous sodium dodecylbenzenesulfonate solution having a concentration of 5 wt % (1.57 parts by weight based on the monomer) was additionally added to obtain a vinyl chloride resin latex (amount of sodium dodecylbenzenesulfonate per 100 parts by weight of vinyl chloride homopolymer: 2.30 parts by weight). The average particle diameter was measured and found to be 0.1 μm.

The storage stability of the latex was evaluated, as a result, absolutely no precipitate generation was observed (A) and thus, the result was good. When an image forming test was performed, printing was clear and absolutely no blur was observed, revealing a good result (score: 5).

Example 6

A 2.5-L autoclave was charged with 900 g of deionized water, 650 g of vinyl chloride monomer, 5 g of 3 wt % potassium persulfate, and 75 g of an aqueous sodium dodecylbenzenesulfonate solution having a concentration of 5 wt % (0.58 parts by weight based on the monomer), and by raising the temperature to 66° C., emulsion polymerization was allowed to proceed. After the saturated vapor pressure of vinyl chloride at 66° C. was reduced to 0.7 MPa, unreacted vinyl chloride monomer was recovered. To the residue, 393 g of an aqueous sodium dodecylbenzenesulfonate solution having a concentration of 5 wt % (3.02 parts by weight based on the monomer) was additionally added to obtain a vinyl chloride resin latex (amount of sodium dodecylbenzenesulfonate per 100 parts by weight of vinyl chloride homopolymer: 4.00 parts by weight). The average particle diameter was measured and found to be 0.1 μm.

The storage stability of the latex was evaluated, as a result, absolutely no precipitate generation was observed (A) and thus, the result was good. When an image forming test was performed, printing was clear and absolutely no blur was observed, revealing a good result (score: 5).

Example 7

A 2.5-L autoclave was charged with 900 g of deionized water, 750 g of vinyl chloride monomer, 5 g of 3 wt % potassium persulfate, and 75 g of an aqueous potassium dodecylbenzenesulfonate solution having a concentration of 5 wt % (0.50 parts by weight based on the monomer), and by raising the temperature to 66° C., emulsion polymerization was allowed to proceed. After the saturated vapor pressure of vinyl chloride at 66° C. was reduced to 0.7 MPa, unreacted vinyl chloride monomer was recovered. To the residue, 195 g of an aqueous potassium dodecylbenzenesulfonate solution having a concentration of 5 wt % (1.30 parts by weight based on the monomer) was additionally added to obtain a vinyl chloride resin latex (amount of potassium dodecylbenzenesulfonate per 100 parts by weight of vinyl chloride homopolymer: 2.00 parts by weight). The average particle diameter was measured and found to be 0.1 μm.

The storage stability of the latex was evaluated, as a result, absolutely no precipitate generation was observed (A) and thus, the result was good. When an image forming test was performed, printing was clear and absolutely no blur was observed, revealing a good result (score: 5).

Example 8

A 2.5-L autoclave was charged with 830 g of deionized water, 750 g of vinyl chloride monomer, 6.8 g of 3 wt % potassium persulfate, and 75 g of an aqueous sodium dodecylbenzenesulfonate solution having a concentration of 5 wt % (0.50 parts by weight based on the monomer), and by raising the temperature to 66° C., emulsion polymerization was initiated. The temperature was kept at 66° C. and when 60 minutes passed after the initiation of polymerization, 270 g of an aqueous sodium dodecylbenzenesulfonate solution having a concentration of 5 wt % (1.80 parts by weight based on the monomer) was continuously added over 360 minutes. After the pressure in the autoclave at 66° C. was reduced to 0.7 MPa, unreacted vinyl chloride monomer was recovered, and a vinyl chloride resin latex was obtained (amount of sodium dodecylbenzenesulfonate per 100 parts by weight of vinyl chloride homopolymer: 2.56 parts by weight). The average particle diameter was measured and found to be 0.1 μm.

The storage stability of the latex was evaluated, as a result, absolutely no precipitate generation was observed (A) and thus, the result was good. When an image forming test was performed, printing was clear and absolutely no blur was observed, revealing a good result (score: 5).

Example 9

A 2.5-L autoclave was charged with 900 g of deionized water, 750 g of vinyl chloride monomer, 5 g of 3 wt % potassium persulfate, and 75 g of an aqueous sodium dodecylbenzenesulfonate solution having a concentration of 5 wt % (0.50 parts by weight based on the monomer), and by raising the temperature to 66° C., emulsion polymerization was allowed to proceed. After the saturated vapor pressure of vinyl chloride at 66° C. was reduced to 0.7 MPa, unreacted vinyl chloride monomer was recovered. To the residue, 235 g of an aqueous sodium dodecylbenzenesulfonate solution having a concentration of 5 wt % (1.57 parts by weight based on the monomer) and 45 g of an aqueous potassium laurate solution having a concentration of 5 wt % (0.30 parts by weight based on the monomer) were additionally added to obtain a vinyl chloride resin latex (amounts of sodium dodecylbenzenesulfonate and potassium laurate, per 100 parts by weight of vinyl chloride homopolymer: 2.30 parts by weight and 0.33 part by weight, respectively). The average particle diameter was measured and found to be 0.1 μm.

The storage stability of the latex was evaluated, as a result, absolutely no precipitate generation was observed (A) and thus, the result was good. When an image forming test was performed, printing was clear and absolutely no blur was observed, revealing a good result (score: 5).

Example 10

A 2.5-L autoclave was charged with 830 g of deionized water, 750 g of vinyl chloride monomer, 6.8 g of 3 wt % potassium persulfate, and 75 g of an aqueous sodium dodecylbenzenesulfonate solution having a concentration of 5 wt % (0.50 parts by weight based on the monomer), and by raising the temperature to 66° C., emulsion polymerization was initiated. The temperature was kept at 66° C. and when 60 minutes passed after the initiation of polymerization, 270 g of an aqueous sodium dodecylbenzenesulfonate solution having a concentration of 5 wt % (1.80 parts by weight based on the monomer) was continuously added over 360 minutes. After the pressure in the autoclave at 66° C. was reduced to 0.7 MPa, unreacted vinyl chloride monomer was recovered and to the residue, 15 g of an aqueous potassium laurate solution having a concentration of 5 wt % (0.10 parts by weight based on the monomer) was additionally added to obtain a vinyl chloride resin latex (amounts of sodium dodecylbenzenesulfonate and potassium laurate, per 100 parts by weight of vinyl chloride homopolymer: 2.56 parts by weight and 0.11 parts by weight, respectively). The average particle diameter was measured and found to be 0.1 µm.

The storage stability of the latex was evaluated, as a result, absolutely no precipitate generation was observed (A) and thus, the result was good. When an image forming test was performed, printing was clear and absolutely no blur was observed, revealing a good result (score: 5).

Example 11

A 2.5-L autoclave was charged with 830 g of deionized water, 750 g of vinyl chloride monomer, 6.8 g of 3 wt % potassium persulfate, and 75 g of an aqueous sodium dodecylbenzenesulfonate solution having a concentration of 5 wt % (0.50 parts by weight based on the monomer), and by raising the temperature to 66° C., emulsion polymerization was initiated. The temperature was kept at 66° C. and when 60 minutes passed after the initiation of polymerization, 270 g of an aqueous sodium dodecylbenzenesulfonate solution having a concentration of 5 wt % (1.80 parts by weight based on the monomer) was continuously added over 360 minutes. After the pressure in the autoclave at 66° C. was reduced to 0.7 MPa, unreacted vinyl chloride monomer was recovered and to the residue, 45 g of an aqueous potassium laurate solution having a concentration of 5 wt % (0.30 parts by weight based on the monomer) was additionally added to obtain a vinyl chloride resin latex (amounts of sodium dodecylbenzenesulfonate and potassium laurate, per 100 parts by weight of vinyl chloride homopolymer: 2.56 parts by weight and 0.33 parts by weight, respectively). The average particle diameter was measured and found to be 0.1 µm.

The storage stability of the latex was evaluated, as a result, absolutely no precipitate generation was observed (A) and thus, the result was good. When an image forming test was performed, printing was clear and absolutely no blur was observed, revealing a good result (score: 5).

Example 12

A 2.5-L autoclave was charged with 830 g of deionized water, 750 g of vinyl chloride monomer, 6.8 g of 3 wt % potassium persulfate, and 75 g of an aqueous sodium dodecylbenzenesulfonate solution having a concentration of 5 wt % (0.50 parts by weight based on the monomer), and by raising the temperature to 66° C., emulsion polymerization was initiated. The temperature was kept at 66° C. and when 60 minutes passed after the initiation of polymerization, 270 g of an aqueous sodium dodecylbenzenesulfonate solution having a concentration of 5 wt % (1.80 parts by weight based on the monomer) and 45 g of an aqueous potassium laurate solution having a concentration of 5 wt % (0.30 parts by weight based on the monomer) were continuously added over 360 minutes. After the pressure in the autoclave at 66° C. was reduced to 0.7 MPa, unreacted vinyl chloride monomer was recovered, and a vinyl chloride resin latex was obtained (amounts of sodium dodecylbenzenesulfonate and potassium laurate, per 100 parts by weight of vinyl chloride homopolymer: 2.56 parts by weight and 0.33 parts by weight, respectively). The average particle diameter was measured and found to be 0.1 µm.

The storage stability of the latex was evaluated, as a result, absolutely no precipitate generation was observed (A) and thus, the result was good. When an image forming test was performed, printing was clear and absolutely no blur was observed, revealing a good result (score: 5).

Comparative Example 1

A 2.5-L autoclave was charged with 900 g of deionized water, 750 g of vinyl chloride monomer, 5 g of 3 wt % potassium persulfate, and 75 g of an aqueous sodium dodecylbenzenesulfonate solution having a concentration of 5 wt % (0.50 parts by weight based on the monomer), and by raising the temperature to 66° C., emulsion polymerization was allowed to proceed. After the saturated vapor pressure of vinyl chloride at 66° C. was reduced to 0.7 MPa, unreacted vinyl chloride monomer was recovered, and a vinyl chloride resin latex was obtained (amount of sodium dodecylbenzenesulfonate per 100 parts by weight of vinyl chloride homopolymer: 0.56 parts by weight). The average particle diameter was measured and found to be 0.1 µm.

The storage stability of the latex was evaluated, as a result, considerable precipitate generation was observed (C) and thus, the result was poor. However, when an image forming test was performed, printing was clear and absolutely no blur was observed, revealing a good result (score: 5).

Comparative Example 2

A 2.5-L autoclave was charged with 900 g of deionized water, 750 g of vinyl chloride monomer, 5 g of 3 wt % potassium persulfate, and 75 g of an aqueous sodium dodecylbenzenesulfonate solution having a concentration of 5 wt % (0.50 parts by weight based on the monomer), and by raising the temperature to 66° C., emulsion polymerization was allowed to proceed. After the saturated vapor pressure of vinyl chloride at 66° C. was reduced to 0.7 MPa, unreacted vinyl chloride monomer was recovered. To the residue, 245 g of an aqueous sodium dodecylbenzenesulfonate solution having a concentration of 15 wt % (4.90 parts by weight based on the monomer) was additionally added to obtain a vinyl chloride resin latex (amount of sodium dodecylbenzenesulfonate per 100 parts by weight of vinyl chloride homopolymer: 6.00 parts by weight). The average particle diameter was measured and found to be 0.1 µm.

The storage stability of the latex was evaluated, as a result, absolutely no precipitate generation was observed (A) and thus, the result was good. However, when an image forming test was performed, although print contents were readable, the color was pale, revealing a poor result (score: 3).

Comparative Example 3

A 2.5-L autoclave was charged with 900 g of deionized water, 750 g of vinyl chloride monomer, 5 g of 3 wt % potassium persulfate, and 75 g of an aqueous sodium alkyldiphenyletherdisulfonate solution having a concentration of 5 wt % (0.50 parts by weight based on the monomer), and by raising the temperature to 66° C., emulsion polymerization was allowed to proceed. After the saturated vapor pressure of vinyl chloride at 66° C. was reduced to 0.7 MPa, unreacted vinyl chloride monomer was recovered. To the residue, 393 g of an aqueous sodium alkyldiphenyletherdisulfonate solution having a concentration of 5 wt % (2.62 parts by weight based on the monomer) was additionally added to obtain a vinyl chloride resin latex (amount of sodium alkyldiphenyletherdisulfonate per 100 parts by weight of vinyl chloride homopolymer: 3.47 parts by weight). The average particle diameter was measured and found to be 0.1 μm.

The storage stability of the latex was evaluated, as a result, absolutely no precipitate generation was observed (A) and thus, the result was good. However, when an image forming test was performed, although print contents were readable, the color was pale, revealing a poor result (score: 3).

While the invention has been described in detail and with reference to specific embodiments thereof, it will be apparent to one skilled in the art that various changes and modifications can be made therein without departing from the spirit and scope of the invention.

This application is based on Japanese Patent Application (Patent Application No. 2010-236779) filed on Oct. 21, 2010, the contents of which are incorporated herein by way of reference.

INDUSTRIAL APPLICABILITY

The vinyl chloride resin latex of the present invention is excellent in the storage stability and therefore, a thermal sublimation transfer image-receiving sheet allowing for excellent image formation can be provided. Hence, the present invention has a remarkable industrial value.

The invention claimed is:

1. A vinyl chloride resin latex for a thermal sublimation transfer image-receiving sheet, comprising:
    a vinyl chloride homopolymer;
    an alkylbenzenesulfonate salt; and
    a potassium salt of lauric acid,
    wherein the alkylbenzenesulfonate salt is present and contained in an amount of more than 1 part by weight to 5 parts by weight per 100 parts by weight of the vinyl chloride homopolymer and
    wherein the potassium salt of lauric acid is present and contained in an amount of 3.0 parts by weight or less per 100 parts by weight of the vinyl chloride homopolymer.

2. The vinyl chloride resin latex for a thermal sublimation transfer image-receiving sheet according to claim 1,
    wherein the alkylbenzenesulfonate salt is sodium dodecylbenzenesulfonate.

3. The vinyl chloride resin latex for a thermal sublimation transfer image-receiving sheet according to claim 1,
    wherein an average particle diameter of the vinyl chloride homopolymer is 0.3 μm or less.

\* \* \* \* \*